Figure 1:
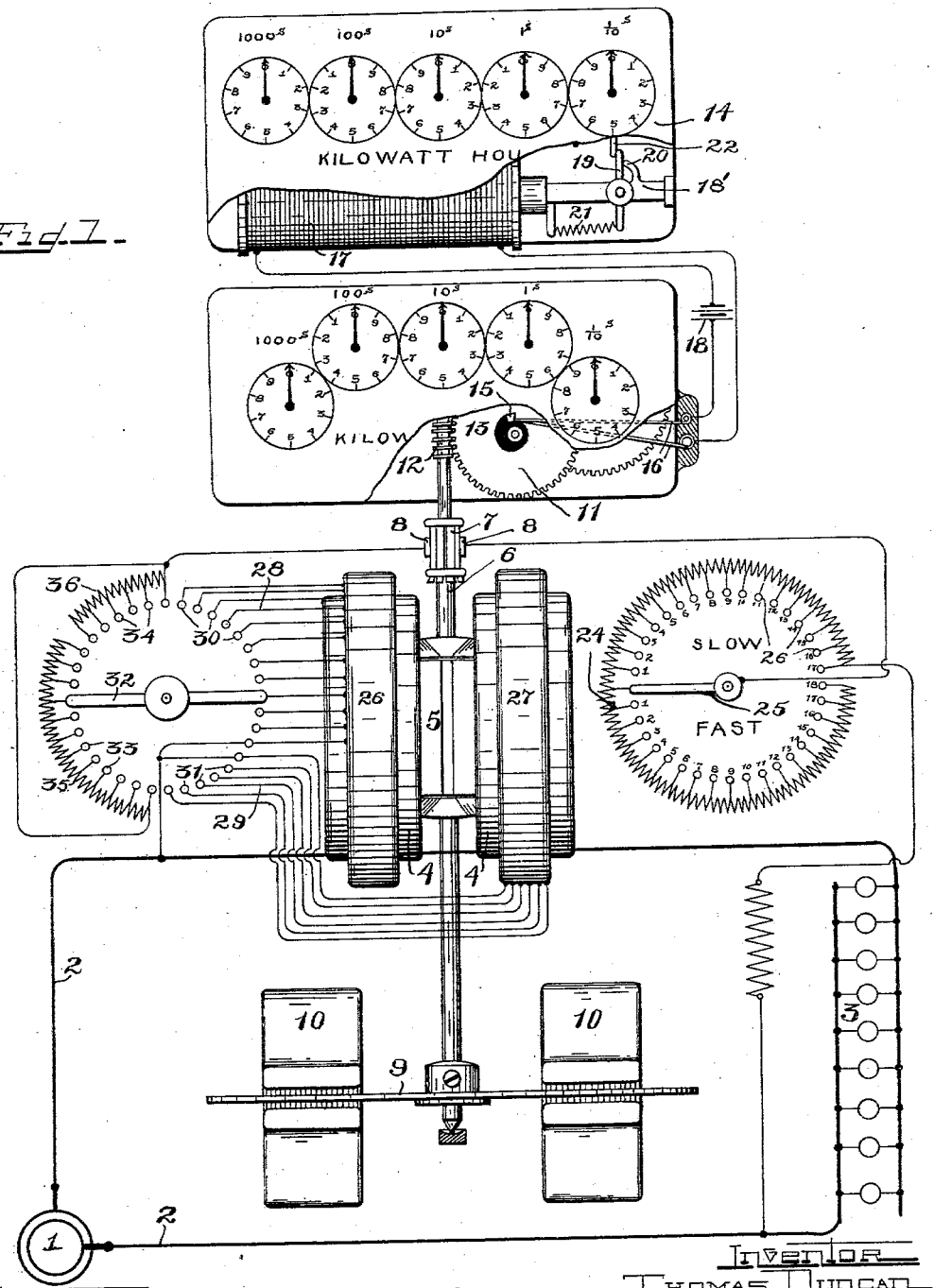

No. 753,191. PATENTED FEB. 23, 1904.
T. DUNCAN.
ELECTRIC METER.
APPLICATION FILED JULY 11, 1901.
NO MODEL. 2 SHEETS—SHEET 1.

No. 753,191. PATENTED FEB. 23, 1904.
T. DUNCAN.
ELECTRIC METER.
APPLICATION FILED JULY 11, 1901.
NO MODEL. 2 SHEETS—SHEET 2.
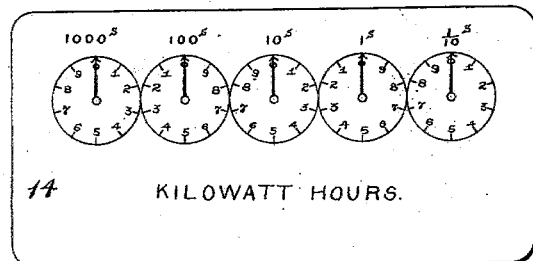
Fig. 2
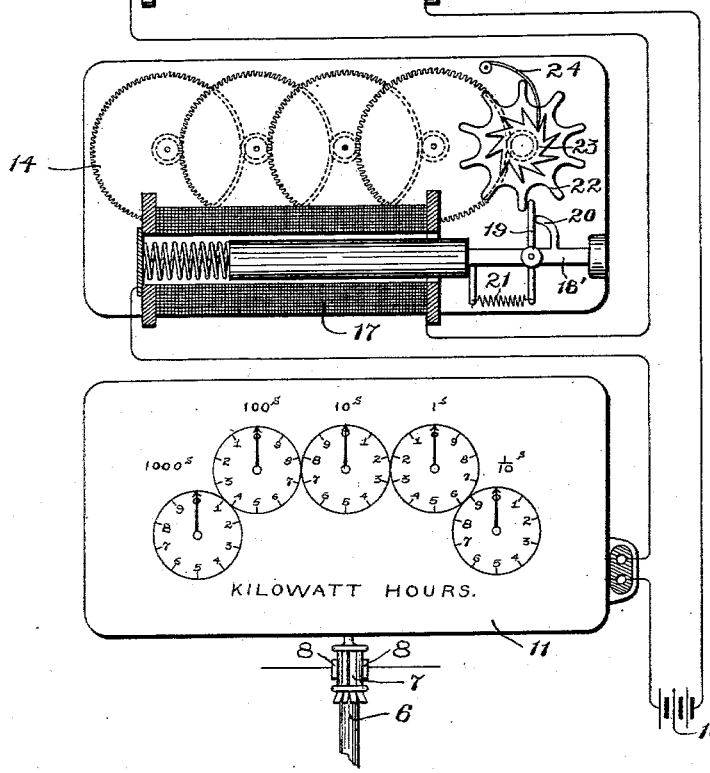
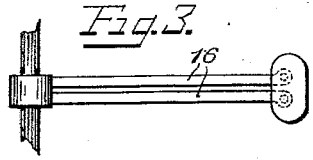
Fig. 3.
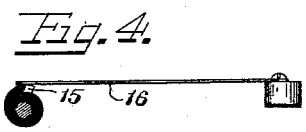
Fig. 4.
Witnesses
Harvey L. Hanson
Max W. Zabel
Inventor
Thomas Duncan
By Charles A. Brown
Cragg & Brefield
Attorneys No. 753,191. Patented February 23, 1904.

UNITED STATES PATENT OFFICE.

THOMAS DUNCAN, OF CHICAGO, ILLINOIS.

ELECTRIC METER.

SPECIFICATION forming part of Letters Patent No. 753,191, dated February 23, 1904.

Application filed July 11, 1901. Serial No. 67,821. (No model.)

*To all whom it may concern:*

Be it known that I, THOMAS DUNCAN, a citizen of the United States, residing at Chicago, in the county of Cook and State of Illinois, have invented a certain new and useful Improvement in Electric Meters, of which the following is a full, clear, concise, and exact description, reference being had to the accompanying drawings, forming a part of this specification.

My invention relates to meters, particularly the integrating type, and has for its objects, first, the provision of means whereby a supplemental measuring mechanism may be operated by the main measuring mechanism, so that the meter with the measuring mechanism mechanically associated therewith may be located in one place, while the supplemental measuring mechanism may be located at another (a more convenient) place—as, for example, the library or office of the consumer—so that the consumer may readily keep track of the measurements from day to day or week to week by an inspection of the supplemental measuring mechanism without having to inspect the meter proper, that may be located in a somewhat inaccessible place; second, to provide a meter that can be easily recalibrated without removing the same from its installed position and without having to readjust the damping-magnets.

Meters are usually left uninspected until the consumer finds fault with his bills or the bookkeeper considers the charges too small. More recently it has been the practice to examine the meters at stated intervals. Heretofore when meters were not operating at the proper rate per unit of load or energy they were readjusted usually by changing the position of the damping-magnets, increasing the drag due to the damping device when the meter operated too fast or decreasing the dragging action when the meter operated too slow. A decreased rate of speed per unit of load or energy is usually due to an increase in the friction between the moving parts, and when the drag is reduced to compensate for it the characteristic of the meter is not straightened as it should be, because the friction will still be in evidence on light loads. As a matter of fact the adjustment of the damping device is not the best practice, since it requires considerable time to do it accurately and necessitates the loosening of the screws that retain the magnets.

The inspector is enabled by means of my invention to readily compensate for error in the meter immediately after the test and without delay, a step-by-step percentage-adjusting means being provided which may be set corresponding to the percentage in increase or decrease of speed per unit of energy or load with relation to the normal, whereby the normal rate of operation of the meter is at once reestablished without modifying the mechanical arrangement of the meter elements. I provide also improved step-by-step adjusting means in combination with supplemental field-windings for effecting additive or counteracting torque to increase or decrease the normal starting torque of the meter.

I will explain my invention more fully by reference to the accompanying drawings, in which—

Figure 1 is a diagrammatic view of a system of electrical distribution with a meter constructed in accordance with my invention associated therewith. Fig. 2 is a diagrammatic view illustrating two supplemental measuring mechanisms in connection with the meter. Fig. 3 is a side view of a pair of terminals that may be electrically associated with the supplemental counting mechanism to effect its actuation. Fig. 4 is a plan view of the structure illustrated in Fig. 3.

Like parts are indicated by similar characters of reference throughout the different figures.

In Fig. 1 I have illustrated a source of alternating current 1, supplying current over transmission-mains 2 2 to translating devices 3. I do not wish to be limited, however, to an alternating-current system of distribution, as my invention is equally applicable to other systems of electrical distribution. The field-winding of the meter may be subdivided into coils 4 4, between which the pressure-winding 5 of the meter—in this instance in the form of an armature-winding—is disposed. The armature of the meter is mounted upon a rotatable shaft 6, which carries a commutator 7 for the armature, commutator-brushes 8 8 engaging the commutator to connect the winding 5 in bridge of the transmission-mains. The lower end of the shaft may be provided with a damping-disk 9, arranged within the fields of the permanent magnets 10 10, which damping-magnets on account of my present invention may be firmly clamped in fixed locations. The shaft of the meter may operate the counting-train 11, that preferably has mechanical engagement with the shaft through the agency of a worm 12, that engages one of the wheels 13 of the counting-train. This counting-train serves to operate the supplemental counting-train 14 of a supplemental measuring mechanism that may be located at any distance desired from the meter. Additional supplemental counting mechanisms may be operated by the same meter, as illustrated in Fig. 2.

For the purpose of operating the supplemental counting-train 14 of the supplemental mechanism to effect a reading thereat corresponding to the reading of the measuring mechanism at the meter proper I prefer to employ a circuit closing or changing element 15, that may be mounted fixedly upon the hub of the wheel 13 and which may periodically effect engagement between the springs 16, that constitute the terminals of a circuit including an electromagnet 17 and a source of current 18, thereby effecting periodic energizations of the magnet 17. This magnet 17 is preferably in the form of a solenoid whose core carries a shifting support 18', upon which is centrally pivoted an actuating-pawl 19, normally maintained against a stop 20 through the action of a spring 21. The pawl 19 is adapted for engagement with the star-wheel 22 and actuates the same each time the circuit including the magnet 17 is closed. To operate in this instance the counting-train of the supplemental counting mechanism at identically the same rate that the counting-train of the main counting mechanism is operated, the star-wheel 22 is provided with a detent-wheel 23, that engages a locking-dog 24, preferably in the form of a strip-metal spring which may yield slightly when the pawl 19 is restored upon the deënergization of the magnet 17 preparatory to effecting another actuation of the star-wheel.

The supplemental counting mechanism may thus be located wherever convenient, so as to be readily inspected by the consumer whenever desirable. In the drawings the supplemental and main counting mechanisms are shown close together; but it is to be understood that the preferred use to which the invention is put is to enable the counting-trains to be widely separated. In Fig. 2 the reading-dial has been removed from one of the supplemental counting mechanisms to illustrate the measuring-train.

The armature 5 of the meter is preferably provided with a step-by-step percentage-adjusting resistance 24, provided for the purpose of recalibrating the meter after it has been once installed. To bring the same back to a normal rate of operation per unit of load or energy, the resistance 24 is provided with a switch-arm 25 and contact-buttons 26, which correspond with various percentages and to which the switch-arm 25 is moved to include more resistance or exclude the same from circuit with the armature, accordingly as it is required to reduce or increase the speed of the meter. The arm 25 is illustrated in a neutral position, which is the position the arm preferably is caused to assume after the meter has been calibrated at the factory, resistance being disposed upon each side of this switch, so that when the switch is moved in a clockwise direction this resistance is excluded from circuit with the armature to increase the speed of the instrument, and when the arm is moved in a contra-clockwise direction more resistance is included in circuit to decrease the speed of the instrument. After the meter has been in service for some length of time and it should be found to run, say, five per cent. too fast the switch-arm 25 may be moved in a contra-clockwise direction toward the contact-button marked "5 Fast," whereby more resistance is included in circuit with the armature and the speed reduced to the normal. If the speed of the meter has become reduced, for example, three per cent., due to increased friction in the bearings, the switch-arm 25 may be moved in a clockwise direction toward the contact-button marked "3 Slow," thereby excluding a sufficient amount of the resistance 24 from circuit with the armature to speed the meter up to normal. The switch-arm 25 may be left in the position to which it has been adjusted until some future time, when the meter may be readjusted by other means, as by an adjustment of the damping-magnets. The variation from the normal speed may differ from month to month. It may be four per cent. too fast one month and two per cent. too fast another month, the necessary correction being readily effected by the manipulation of the switch-arm 25. This feature of the invention is also particularly useful in connection with standard meters, by which others are calibrated, possessing the particular advantage that they may be frequently checked, as once every hour, if thought advisable. Such a meter is also particularly useful for laboratory purposes, where meters are frequently changed from place to place and where the greatest accuracy may be readily obtained to compensate for modified operation of the meter due to its changed condition and surroundings—as, for example, the meter may be subject to more or less stray fields from dynamos, meters, &c., which may be rapidly compensated for.

I employ supplemental pressure field-windings 26 27, that are preferably stationary and which are provided with a number of leads 28 29, branching from various portions of the supplemental pressure-coils and terminating in switch-buttons 30 and 31. The switch-arm 32 is also adapted for engagement with resistance or rheostat buttons 33 and 34, which constitute the terminals of resistance-sections of the rheostats 35 36, these resistances 35 36 being connected in series with the armature and the resistance 24. The supplemental pressure field-coils 26 27 are oppositely wound, so that the coil 26, for example, when in circuit will augment the starting torque, while if the coil 27 were in circuit a counter-torque would be effected. In making a regular load test the arm 25 is put upon its proper percentage-button, whereafter one lamp is put in circuit, and if the meter is found to be operating too slow the switch-arm 32 is moved over resistance-buttons 33 34 and those connected to the coils 26 and 27 until the meter registers correctly. When the arm 32 rests upon the uppermost button of the series 30, it also engages the lowermost button of the series 33, in which adjustment all of the coil 26 is in circuit and none of the resistance 35. As this switch is moved in a clockwise direction turns of the winding 26 are gradually cut out of circuit and an equivalent amount of ohmic resistance 35 is cut into circuit, so that while the field due to the winding 26 is lessened the amount of current flowing through the same is maintained constant, whereby the field due to the armature-winding 5 is not modified by variation in the number of turns in the winding 26 that may be included in series with the armature. Correspondingly, if the arm 32 rests upon the uppermost button of the series 34 it also engages the lowermost button of the series 31, in which adjustment none of the resistance 36 is included in circuit and all of the turns of the winding 27 are included in circuit. As the arm 32 is moved in a contra-clockwise direction turns of the winding 27 are cut out of circuit and a corresponding quantity of ohmic resistance 36 is included in circuit to maintain the flow of current through the armature 5 constant, irrespective of the number of turns 27 that may be in circuit with the armature. If the meter is found to be running fast on light load or perhaps creeping on no load at all, due, for example, to vibration of the building, then turns of winding 27 are brought into circuit and their equivalent resistance 36 cut out of circuit. When the arm 32 is in position to exclude all of the turns of the winding 27, it also includes the total equivalent resistance 36 in circuit with the armature.

In the present application I have shown a specific adaptation of the pressure field-windings. In my copending application, Serial No. 68,751, filed July 18, 1901, I have broadly claimed the supplemental pressure field-winding in association with switching apparatus, whereby more or less of the winding can be included in circuit. In my application, Serial No. 178,249, filed October 23, 1903, I have broadly claimed the application of supplemental field-windings in combination with switching apparatus for varying the number of turns thereof to enable said supplemental pressure field-windings to act as torque-coils, the switching apparatus serving, by varying the number of turns, to vary the strength of the fields to the torque-coils, thereby compensating for friction. In my application, Serial No. 68,751, filed July 18, 1901, I have broadly claimed the supplemental pressure-coils 26 27, as herein shown.

While I have herein shown and particularly described the preferred embodiment of my invention, it is obvious that changes may be readily made without departing from the spirit thereof, and I do not wish to be limited to the precise disclosure herein set forth; but,

Having thus described my invention, I claim as new and desire to secure by Letters Patent—

1. In a system of electrical distribution, the combination with a current-generator, of a meter receiving current therefrom, a graduated resistance 24 in circuit with a winding of the meter, a switch-arm 25 including the resistance 24 in circuit, means whereby the torque of the meter may be adjusted to permit the switch-arm 25 to be located to normally include a portion only of the resistance 24, whereby the said switch-arm may be rotated in one direction or the other to readjust the torque of the meter when thrown out of adjustment, substantially as described.

2. In a system of electrical distribution, the combination with a current-generator, of a meter receiving current therefrom, a graduated resistance 24 in circuit with a winding of the meter, a switch-arm 25 including the resistance 24 in circuit, and means for adjusting the initial torque of the meter, whereby the switch-arm 25 may be located to normally include a portion only of the resistance 24, whereby the said switch-arm may be rotated in one direction or the other to readjust the torque of the meter when thrown out of adjustment, substantially as described.

3. The combination with a system of electrical distribution, of a meter receiving current therefrom, a winding for producing supplemental torque, a resistance in circuit with the winding, and switching mechanism whereby resistance is included in circuit as turns of the supplemental winding are cut out of circuit and vice versa, substantially as described.

4. The combination with a system of electrical distribution, of a meter receiving current therefrom, a winding for producing supplemental torque in circuit with a main winding of the meter, a resistance in circuit with a main winding of the meter, and switching mechanism whereby the resistance is included in circuit as turns of the supplemental winding are cut out of circuit and vice versa, whereby a variation of the number of turns of the supplemental winding will not modify the current flowing through the main winding, substantially as described.

5. The combination with a system of electrical distribution, of a meter receiving current therefrom, a winding for producing supplemental torque in series with a main winding of the meter, a resistance in series with the supplemental and main windings of the meter, and switching mechanism whereby the resistance is included in circuit as turns of the supplemental winding are cut out of circuit and vice versa, whereby a variation of the number of turns of the supplemental winding will not modify the current flowing through the main winding, substantially as described.

6. The combination with a system of electrical distribution, of a meter receiving current therefrom, windings for producing supplemental torques, one in aid of the torque of the meter and the other in opposition to the torque of the meter, switching mechanism for including one or the other of the said windings in series with a main winding of the meter, and a resistance, the said switching mechanism serving to exclude turns of one or the other of the said supplemental torque-producing windings from circuit with the said main field-winding and to include a corresponding amount of ohmic resistance in series with said main field-winding, substantially as described.

7. The combination with a system of electrical distribution, of a meter receiving current therefrom, windings for producing supplemental torques, one in aid of the torque of the meter and the other in opposition to the torque of the meter, switching mechanism for including one or the other of the said windings in series with a main winding of the meter, a resistance, the said switching mechanism serving to exclude turns of one or the other of the said supplemental torque-producing windings from circuit with the said main field-winding and to include a corresponding amount of ohmic resistance in series with said main field-winding, the said field-winding being in the form of an armature, and a commutator with its brushes for including the armature in circuit, substantially as described.

8. The combination with a system of electrical distribution, of a meter receiving current therefrom, windings for producing supplemental torques, one in aid of the torque of the meter and the other in opposition to the torque of the meter, switching mechanism for including one or the other of the said windings in series with a main winding of the meter, a resistance, the said switching mechanism serving to exclude turns of one or the other of the said supplemental torque producing windings from circuit with the said main field-winding and to include a corresponding amount of ohmic resistance in series with said main field-winding, the said field-winding being in the form of an armature, a commutator with its brushes for including the armature in circuit, and an adjustable resistance 24 in circuit with the said main field-winding, substantially as described.

9. The combination with a system of electrical distribution, of a meter receiving current therefrom, windings for producing supplemental torques, one in aid of the torque of the meter and the other in opposition to the torque of the meter, switching mechanism for including one or the other of the said windings in series with a main winding of the meter, a resistance, the said switching mechanism serving to exclude turns of one or the other of the said supplemental torque-producing windings from circuit with the said main field-winding and to include a corresponding amount of ohmic resistance in series with said main field-winding, and an adjustable resistance 24 in circuit with the said main field-winding, substantially as described.

10. A commutated wattmeter having two friction compensating coils exerting opposing torques upon the armature, and means for regulating the torque exerted by one of the coils, substantially as described.

11. A commutated wattmeter having two friction compensating coils exerting opposing torques upon the armature, and means for regulating the torque exerted by both of the coils, substantially as described.

12. A commutated wattmeter having two friction compensating coils exerting opposing torques upon the armature, and means for changing the effective winding of one of the coils, substantially as described.

13. A commutated wattmeter having two friction compensating coils exerting opposing torques upon the armature, and means for changing the effective winding of both of the coils, substantially as described.

14. A commutated wattmeter having two friction compensating coils exerting opposing torques upon the armature, and switching mechanism for regulating the torque exerted by one of the coils, substantially as described.

15. A commutated wattmeter having two friction compensating coils exerting opposing torques upon the armature, and switching mechanism for regulating the torque exerted by both of the coils, substantially as described.

16. A commutated wattmeter having two friction compensating coils exerting opposing torques upon the armature, and switching mechanism serving to cut in and out turns of one of the coils, substantially as described.

17. A commutated wattmeter having two friction compensating coils exerting opposing torques upon the armature, and switching mechanism serving to cut in and out turns of both of the coils, substantially as described.

In witness whereof I hereunto subscribe my name this 3d day of June, A. D. 1901.

THOMAS DUNCAN.

Witnesses:
  GEORGE L. CRAGG,
  HERBERT F. OBERGFELL.